(12) United States Patent
Sakota

(10) Patent No.: US 12,296,974 B2
(45) Date of Patent: May 13, 2025

(54) AIRCRAFT

(71) Applicant: AIRBUS OPERATIONS LIMITED, Bristol (GB)

(72) Inventor: Nebojsa Sakota, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 0 days.

(21) Appl. No.: 18/127,485

(22) Filed: Mar. 28, 2023

(65) Prior Publication Data
US 2023/0406527 A1   Dec. 21, 2023

(30) Foreign Application Priority Data

Mar. 29, 2022  (GB) ..................................... 2204463

(51) Int. Cl.
*B64D 37/16*  (2006.01)
*B64D 37/30*  (2006.01)

(52) U.S. Cl.
CPC ............. *B64D 37/16* (2013.01); *B64D 37/30* (2013.01)

(58) Field of Classification Search
CPC ........ B64D 37/30; B64D 37/32; B64D 37/34; B64D 37/16; B64C 3/32; B64C 3/34
See application file for complete search history.

(56) References Cited

U.S. PATENT DOCUMENTS

| | | |
|---|---|---|
| 5,505,053 A | 4/1996 | Luger et al. |
| 7,302,936 B2 | 12/2007 | Stolarz et al. |
| 9,174,740 B2 | 11/2015 | Stolte et al. |
| 9,310,023 B2 | 4/2016 | Regan |
| 9,458,954 B2 | 10/2016 | Baur et al. |
| 9,933,093 B2* | 4/2018 | Corrêa ................... F16L 27/12 |
| 9,939,087 B2 | 4/2018 | Kolarski et al. |
| 2008/0197137 A1 | 8/2008 | Schlag et al. |
| 2010/0122747 A1 | 5/2010 | Blencoe |
| 2012/0104172 A1 | 5/2012 | Haug et al. |
| 2013/0000747 A1 | 1/2013 | Buresi et al. |
| 2013/0087238 A1 | 4/2013 | Mercier |
| 2014/0124077 A1 | 5/2014 | Malas et al. |

(Continued)

FOREIGN PATENT DOCUMENTS

| | | |
|---|---|---|
| CN | 207712306 | 8/2018 |
| EP | 2 949 980 | 12/2015 |

(Continued)

OTHER PUBLICATIONS

Search Report for GB2204463.0, dated Nov. 23, 2022, 2 pages.

(Continued)

*Primary Examiner* — Tye William Abell
*Assistant Examiner* — Justin Michael Heston
(74) *Attorney, Agent, or Firm* — Nixon & Vanderhye P.C.

(57) ABSTRACT

An aircraft is disclosed including a fuel tank for storing liquid hydrogen, an aircraft power plant and/or an aircraft refuelling port, and a hydrogen fuel line extending from a first end to a second end, the first end at the fuel tank and the second end at one of the aircraft power plant and the aircraft refuelling port. The hydrogen fuel line is rigidly continuous and substantially unconstrained along an axial direction of the hydrogen fuel line between the first end and the second end. The first and/or second end is moveable in the axial direction of the hydrogen fuel line.

20 Claims, 11 Drawing Sheets

(56) References Cited

U.S. PATENT DOCUMENTS

| | | | |
|---|---|---|---|
| 2015/0053820 A1 | 2/2015 | Napp | |
| 2015/0336680 A1* | 11/2015 | Schumacher | F17C 3/00 |
| | | | 244/135 B |
| 2016/0356403 A1 | 12/2016 | Perrigo et al. | |
| 2017/0267368 A1* | 9/2017 | Hara | B64C 1/1453 |
| 2017/0320587 A1* | 11/2017 | Dumas | F04B 43/04 |
| 2020/0072391 A1 | 3/2020 | Bonte et al. | |
| 2020/0393072 A1 | 12/2020 | Shamkhi | |
| 2021/0107674 A1 | 4/2021 | Haberbusch et al. | |
| 2022/0298952 A1* | 9/2022 | Thobe | F01N 13/08 |
| 2023/0086167 A1* | 3/2023 | Milliere | B64D 37/30 |
| | | | 220/88.3 |

FOREIGN PATENT DOCUMENTS

| | | |
|---|---|---|
| EP | 4 056 477 | 9/2022 |
| EP | 4 141 310 A1 | 3/2023 |
| EP | 4 180 706 A1 | 5/2023 |

OTHER PUBLICATIONS

Combined Search and Examination Report for GB2204463.0, dated Sep. 27, 2022, 6 pages.
Extended European Search Report for Application No. EP 23163395.9, nine pages, dated Aug. 8, 2023.

\* cited by examiner

AIRCRAFT

CROSS RELATED APPLICATION

This application claims priority to United Kingdom Patent Application GB 2204463.0, filed Mar. 29, 2022, the entire contents of which is hereby incorporated by reference.

FIELD OF THE INVENTION

The present invention relates to an aircraft, an aircraft refuelling port, and a method of refuelling an aircraft.

BACKGROUND OF THE INVENTION

There is a drive to provide aircraft that can meet future emissions targets. One approach to tackling this challenge is the use of alternative fuels, such as liquid hydrogen. A difficulty in providing aircraft that are powered by alternative fuels, such as liquid hydrogen, is the need to store the fuel in pressurised fuel tanks. These pressurised fuel tanks typically require significant amounts of space, and are therefore positioned away from the engines and other parts of the fuel system. The fuel lines may therefore extend significant distances across the aircraft, and are required to compensate for the effects of airframe deflections caused by aerodynamic and other external loads, as well as account for axial displacements due to exposure of the fuel lines to a wide range of operating temperatures ranging from the cryogenic temperatures of the liquid hydrogen to the potentially much higher temperatures of ambient atmospheric temperatures.

As a result, the fuel lines are formed of multiple discrete sections of fuel pipe connected by couplings, axial compensators, and other connectors. The connections between these various parts are a potential source of leaks, can increase thermal ingress, and make assembly/disassembly more complex.

SUMMARY OF THE INVENTION

A first aspect of the invention provides an aircraft comprising: a fuel tank for storing liquid hydrogen; an aircraft power plant and/or an aircraft refuelling port; and a hydrogen fuel line extending from a first end to a second end, the first end at the fuel tank and the second end at one of the aircraft power plant and the aircraft refuelling port; wherein the hydrogen fuel line is rigidly continuous and substantially unconstrained along an axial direction of the hydrogen fuel line between the first end and the second end; and wherein the first and/or second end is moveable in the axial direction of the hydrogen fuel line.

Rigidly continuous refers to the hydrogen fuel line being uninterrupted by axial compensators, bellows, or any other means of providing significant axial displacement. The material from which the hydrogen fuel line is constructed may itself still offer some relative level of flexibility. The hydrogen fuel line may comprise two or more sections of fuel line that are rigidly connected (e.g. welded or otherwise connected), or the hydrogen fuel line may be one continuous fuel line.

Substantially unconstrained refers to the end of the hydrogen fuel line not being fixedly attached to the aircraft or other structure. This does not preclude some constraint along the hydrogen fuel line (e.g. at the ends and/or at intermediate positions), as long as such a constraint allows at least some relative axial movement to compensate for the loads acting on the hydrogen fuel lines.

Reference to the first end being "at" the fuel tank and the second end being "at" one of the aircraft power plant and the aircraft refuelling port, refers to that end being in the locality of said part. In other words, the end of the fuel line is closer than the other end and close enough to perform its function of allowing fuel in to or out of the tank. In some examples, the end may be directly attached to the fuel tank, aircraft power plant or refuelling port.

With this arrangement, the number of compensators (for compensating axial and/or angular displacements) and other connections on the fuel line may be significantly reduced, thereby reducing potential sites for leakage from the fuel line. This can be particularly beneficial in flight, or when the aircraft is moving, as the loads on the fuel lines (via deflections of the airframe) are greatest at these times.

A second aspect of the invention provides an aircraft comprising: a fuel tank for storing liquid hydrogen; an aircraft refuelling port; and a hydrogen fuel line extending from a first end to a second end, the first end at the fuel tank and the second end at the aircraft refuelling port; wherein the hydrogen fuel line comprises a first fuel pipe configured to convey liquid hydrogen from the aircraft refuelling port to the fuel tank, and a second fuel pipe surrounding the first fuel pipe and configured to convey gases from the fuel tank to the aircraft refuelling port.

With this arrangement, the liquid hydrogen in the first fuel pipe is insulated by the gases in the second fuel pipe that surrounds the first fuel pipe. This may assist in maintaining a low (cryogenic) temperature that maintains the hydrogen in a liquid state, e.g. as it enters the hydrogen fuel tanks.

The second fuel pipe may be configured to convey gaseous hydrogen from the fuel tank to the aircraft refuelling port.

The first end may extend into the fuel tank and be moveable along the axial direction of the hydrogen fuel line.

The second end may be moveable along the axial direction of the hydrogen fuel line.

The second end may be at the aircraft refuelling port.

The second end may be coupled via a flexible element that allows limited movement of the second end relative to the aircraft power plant or aircraft refuelling port.

The hydrogen fuel line may be uninterrupted between the first end and the second end.

The aircraft may comprise an outer pipe surrounding the hydrogen fuel line, wherein the outer pipe is fixedly coupled at a first end at the fuel tank and fixedly coupled at a second end at the aircraft power plant or the aircraft refuelling port.

The aircraft may further comprise a vacuum between the outer pipe and the hydrogen fuel line.

The aircraft may comprise a fuselage and a wing. The hydrogen fuel line may extend between the fuselage and the wing.

The hydrogen fuel line may extend along at least 30% of a total length of the fuselage and/or at least 30% of a span of a wing.

The aircraft power plant may be an aircraft engine or an electromotor.

The aircraft may comprise: two or more fuel tanks; two or more hydrogen fuel lines, each hydrogen fuel line extending from a first end to a second end, each first end at a respective fuel tank and each second end at one of an aircraft power plant and the aircraft refuelling port; wherein each hydrogen fuel line is substantially unconstrained along an axial direction between the first end and the second end; and wherein the first and/or second end of each hydrogen fuel line is moveable in the axial direction of the hydrogen fuel line.

The second end of each of the two or more hydrogen fuel lines may attach to a common coupling so as to be fixedly attached to each other.

The common coupling may be at the aircraft refuelling port.

A third aspect of the invention provides an aircraft refuelling port for delivering liquid hydrogen to a hydrogen fuel tank and recovering gases expelled from the hydrogen fuel tank, the refuelling port configured to attach to a hydrogen refuelling hose on a first side and attach to a hydrogen fuel line on a second side, the refuelling port comprising a first fuel port section configured to convey liquid hydrogen towards a hydrogen fuel tank, and a second fuel port section surrounding the first fuel port section and configured to convey gases away from the hydrogen fuel tank.

A fourth aspect of the invention provides a method of refuelling an aircraft, comprising: coupling a hydrogen refuelling hose to an aircraft refuelling port, the refuelling port comprising a first fuel port section configured to convey liquid hydrogen towards a hydrogen fuel tank, and a second fuel port section surrounding the first fuel port section and configured to convey gases away from the hydrogen fuel tank; delivering liquid hydrogen fuel through the first fuel port section to a hydrogen fuel tank of the aircraft; and recovering gases expelled from the hydrogen fuel tank through the second fuel port section.

With this arrangement, gases expelled from the fuel tank during refuelling can be recovered and prevented from being expelled to atmosphere, for example channelled back to the refuelling tank. Alternatively, the gases can be expelled at an alternative location away from the refuelling port.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
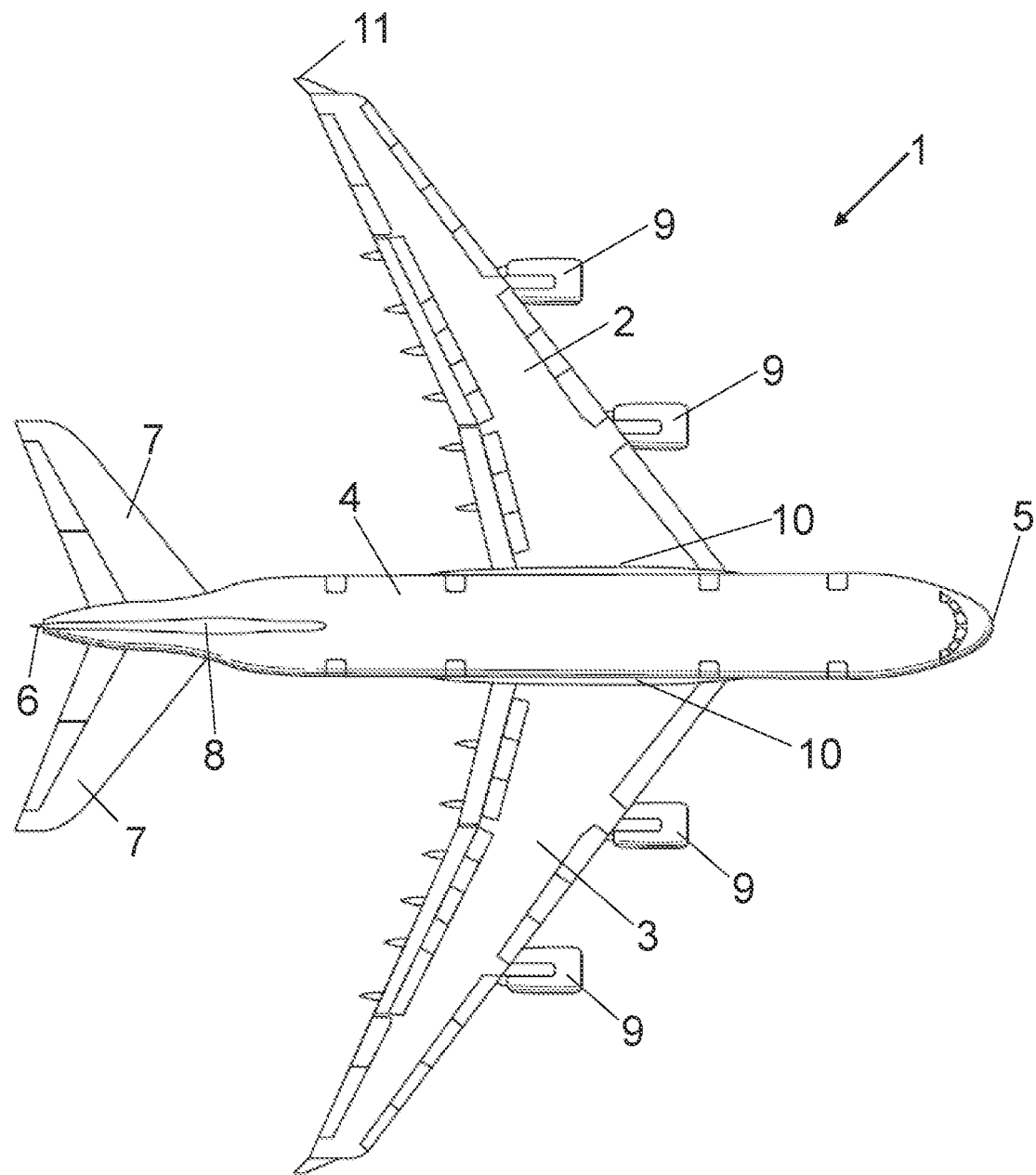
FIG. 1 shows an aircraft.

FIG. 1 shows an existing aircraft 1 with port and starboard fixed wings 2, 3, engines 9, a fuselage 4 with a nose end 5 and a tail end 6, the tail end 6 including horizontal and vertical stabilising surfaces 7, 8. The aircraft 1 is a typical jet passenger transonic transport aircraft but the invention is applicable to a wide variety of fixed wing aircraft types, including commercial, military, passenger, cargo, jet, propeller, general aviation, etc. with any number of engines attached to the wings or fuselage.

Each wing 2, 3 of the aircraft 1 has a cantilevered structure with a length extending in a span-wise direction from a wing root 10 to a wing tip 11, the root 10 being joined to the aircraft fuselage 4.

Endeavours to increase aircraft efficiency mean that improvements to existing aircraft are continuously being made, with one such solution being the use of cryogenic fuels such as liquid hydrogen.

Hydrogen may be utilised as an aviation fuel in a number of ways, such as hydrogen direct burn (e.g. a modified gas turbine engine may provide power by burning hydrogen in the turbojet combustion chambers) or converting the hydrogen to electricity by using fuel cell technology in which the electrochemical cell converts the chemical energy of the hydrogen fuel and an oxidising agent (i.e. oxygen) into electricity through redox reactions.

Figure 2:
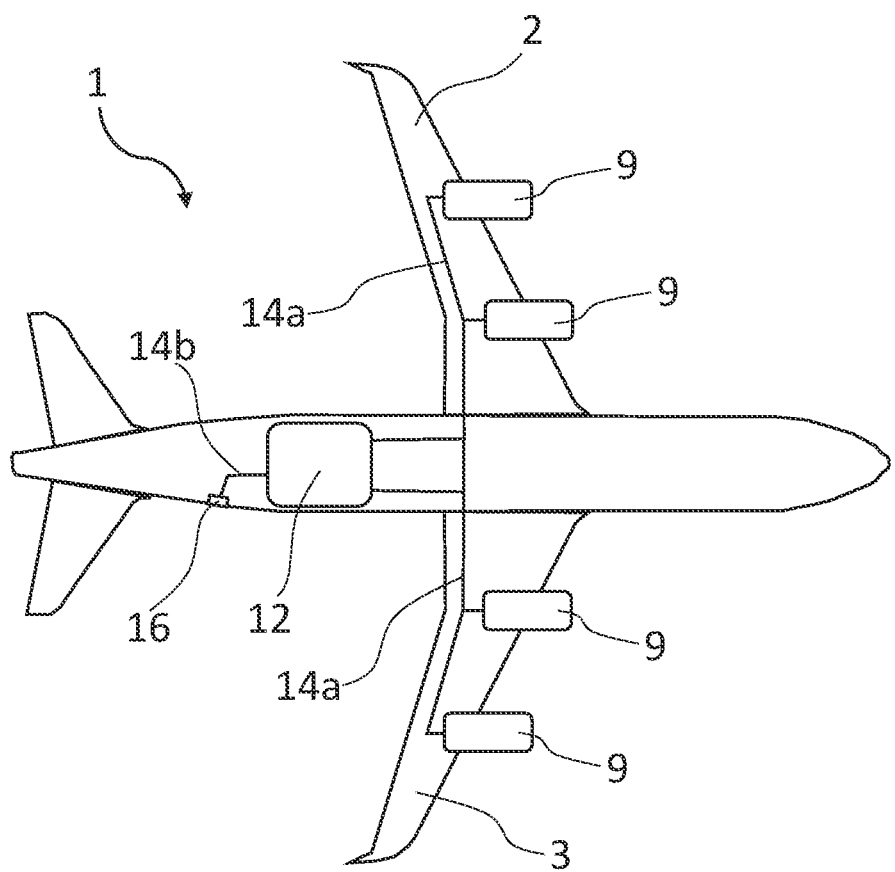
FIG. 2 shows an example of a hydrogen fuel system of the aircraft.
Figure 3:
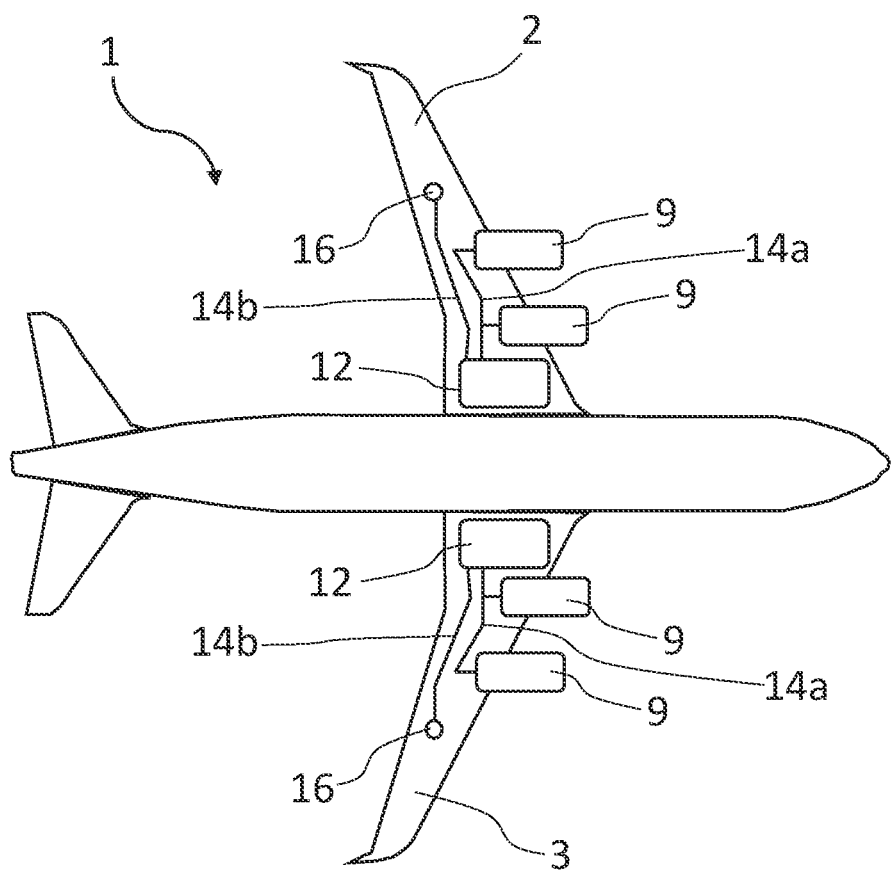
FIG. 3 shows an example of a hydrogen fuel system of the aircraft.

The hydrogen tank(s) 12 may be located in any suitable location on the aircraft 1, but are typically located in separate tanks below the wings 2, 3 (e.g. in fuel pods), in the wings 2, 3 or in one or more fuel tanks located within or adjacent the fuselage 4. FIG. 2 shows a hydrogen fuel tank 12 located towards the rear of the fuselage 4, whilst FIG. 3 shows the tanks located in the wings 2, 3.

Hydrogen fuel lines 14a may extend from the fuel tank(s) 12 to the aircraft power plants (e.g. engines 9 and/or fuel cells 70) so as to channel hydrogen fuel to the power plants (these fuel lines 14a may alternatively be referred to as hydrogen distribution lines 14a). Hydrogen fuel lines 14b may extend from refuelling ports 16 located on an outer surface of the aircraft 1 (such as a lower cover 28 of a wing 2, 3) to the fuel tank(s) 12 (these fuel lines may be referred to as hydrogen refuelling lines 14b).

Dependent on the respective location of the fuel tank(s) 12, power plants, and refuelling ports 16, the hydrogen fuel lines 14a, 14b may extend significant distances through the wing box structure of the wings 2, 3 and/or through or adjacent the structure of the fuselage 4. In the example shown in FIG. 2, the hydrogen fuel lines 14a extend from the engines 9 on the wings 2, 3 to a hydrogen fuel tank 12 located in the fuselage 4, and hydrogen fuel lines 14b extend from the hydrogen fuel tank 12 to a refuelling port 16 located aft of the hydrogen fuel tank 12 in the fuselage 4. In the example shown in FIG. 3, the hydrogen fuel lines 14a extend from the engines 9 on the wings 2, 3 to a hydrogen fuel tank 12 located on the wing 2, 3, and hydrogen fuel lines 14b extend from the hydrogen fuel tank 12 to a refuelling port 16 outboard of the hydrogen fuel tank 12. It will be understood that there are many further permutations, but that at least some of the hydrogen fuel lines 14a, 14b are required to extend significant distances across the aircraft 1.

Figure 4:
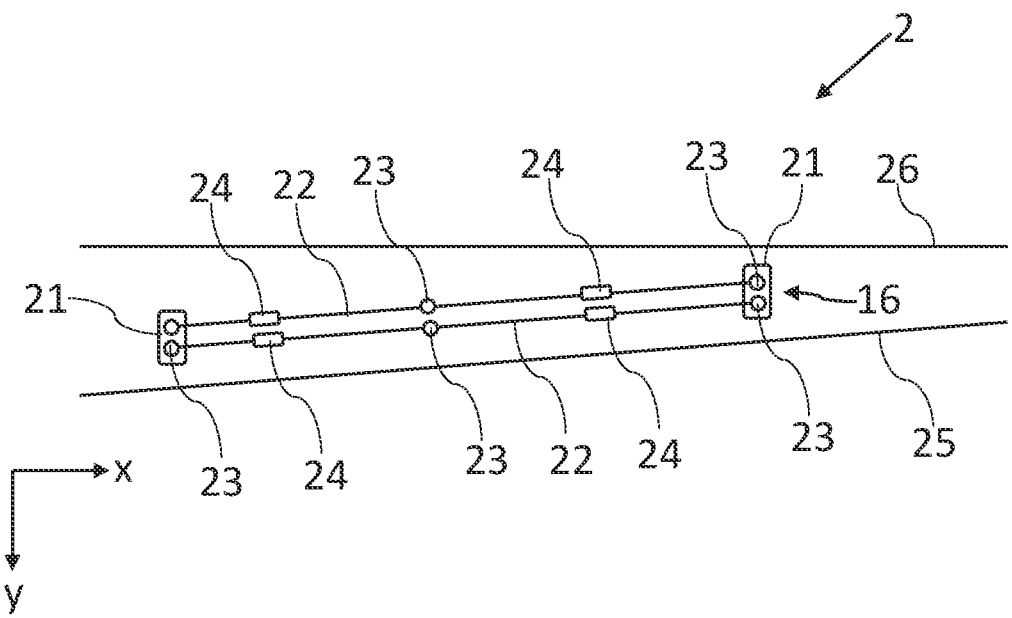
FIG. 4 shows a schematic of a fuel line in a wing viewed from above the aircraft.
Figure 5:
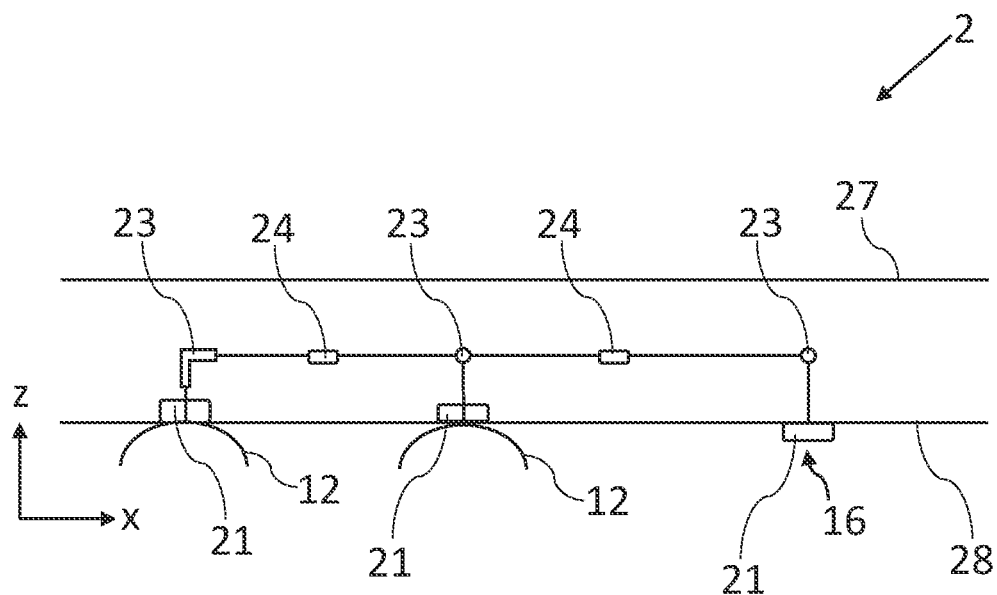
FIG. 5 shows a schematic of the fuel line in the wing viewed in the z-x plane.

Typical hydrogen fuel lines 14a, 14b will be fixedly attached at connectors 21 at either end and include various pipes 22, couplings 23, bellows (e.g. axial compensators 24), as well as valves and control sensors. For instance, FIGS. 4 & 5 show a hydrogen line 14a, 14b in the port wing 2 and extending in the spanwise direction (x-direction) between a leading edge 25 and a trailing edge 26, an upper cover 27 and a lower cover 28 of the wing 2. The longitudinal direction of the aircraft 1 is indicated generally as the y-direction, and the vertical axis is indicated generally as the z-direction.

The fuel line 14a includes a connector 21 at each end, and several couplings 23 and axial compensators 24 along the length of the fuel line 14a, 14b. This can help to mitigate the effect of airframe deflections caused by aerodynamic and other external loads. The axial displacements of the fuel lines 14a, 14b also need to be accounted for due to the exposure of the fuel lines 14a, 14b to a wide range of operating temperatures ranging from the cryogenic temperatures of the liquid hydrogen to the potentially much higher temperatures of ambient, for which axial compensators or similar can be used. The connections between these various parts are a significant potential source of leaks, can increase thermal ingress, and make assembly/disassembly more complex. However, conventionally these various parts are seen as essential to ensuring the hydrogen fuel lines 14a, 14b can withstand the axial and out-of-plane deflections often encountered.

Examples of the invention will now be described in relation to FIGS. 6 to 17, in which like reference numerals are used to denote like parts with the examples of FIGS. 1 to 5, and similar reference numerals but numbered in the 100 series are used to denote similar parts.

According to an example, the aircraft 1 may comprise one or more hydrogen fuel lines 114a that extend from a first end 131 to a second end 132. The first end 131 may be located at a fuel tank 12 and the second end 132 located at an aircraft power plant (e.g. engines 9 and/or fuel cells 70). Alternatively or in addition, the aircraft may comprise one or more hydrogen fuel lines 114b that extend from a first end 131 to a second end 132 and in which the first end 131 is located at a fuel tank 12 and the second end 132 is located at an aircraft refuelling port 16.

In order to mitigate the effects of various loads imparted on the hydrogen fuel lines 114a, 114b (e.g. loads imposed by wing bending, thermal expansion, thermal contraction, or other loads), the hydrogen fuel line 114a, 114b is substantially unconstrained along its axial direction between the first end 131 and the second end 132, and at least one end 131, 132 of the hydrogen fuel line 114a, 114b is moveable in the axial direction of the hydrogen fuel line 114a, 114b.

Figure 6:
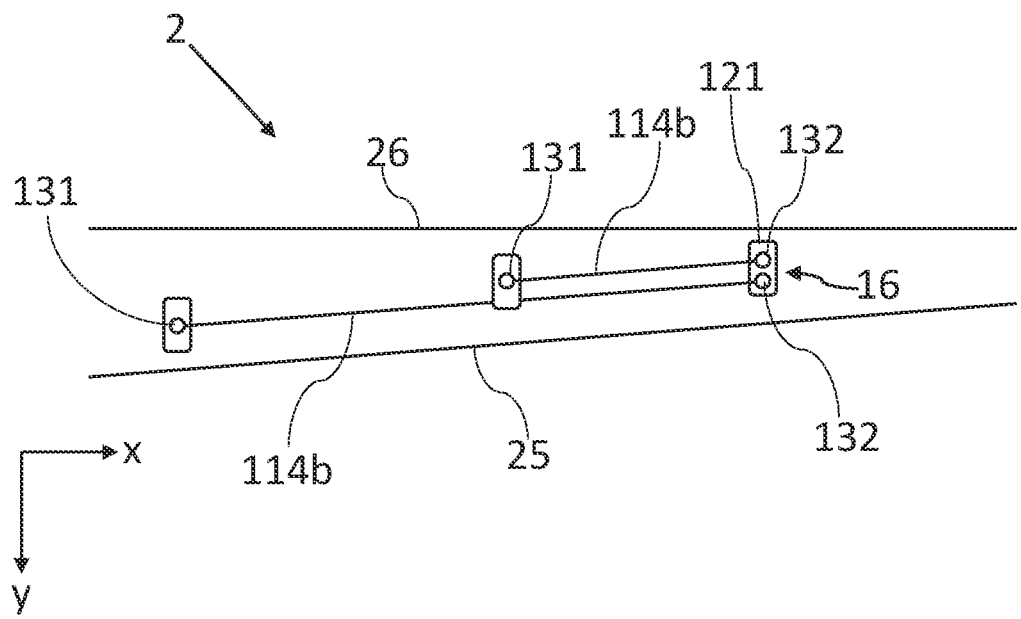
FIG. 6 shows a schematic of an aircraft fuel system in plan view according to the present invention.
Figure 7:
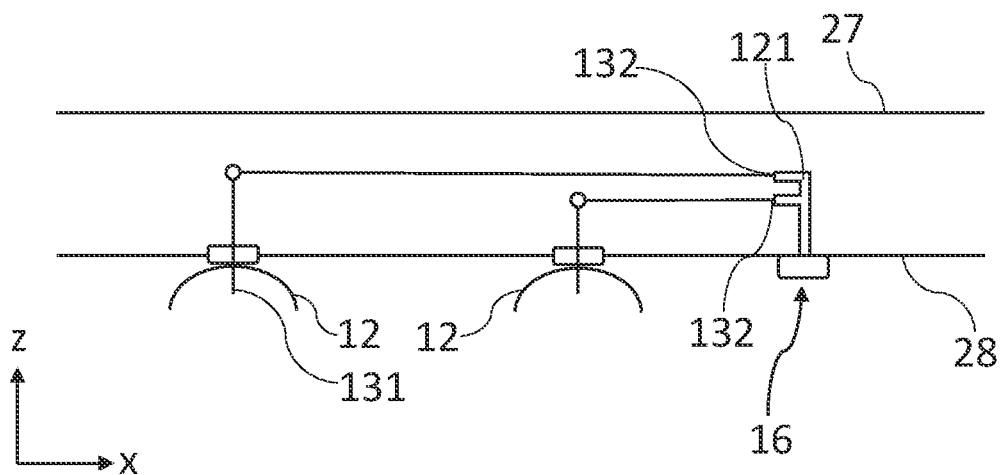
FIG. 7 shows a schematic of the aircraft fuel system of FIG. 6 viewed in the z-x plane.

FIGS. 6 and 7 show an example in which two hydrogen fuel lines 114b extend from a respective hydrogen fuel tank 12 to a common aircraft refuelling port 16. The hydrogen fuel lines 114a, 114b are substantially unconstrained at the first end 131, located at each fuel tank 12, and attach to a common coupling 121 at the second end 132. In this context, substantially unconstrained refers to the end of the hydrogen fuel line 114b not being fixedly attached, although it may still be attached at the end 131, 132 if the constraint allows at least some relative axial movement to compensate for the loads acting on the hydrogen fuel lines 114a, 114b. The common connector 121 may be located at an aircraft refuelling port 16 of the aircraft 1.

As the hydrogen fuel tank 12 is substantially unconstrained at one end 131, 132, specifically the first end 131 in the present example although in other examples the second end 132 may be unconstrained in addition or alternatively, the unconstrained end 131, 132 of the hydrogen fuel line 114b is able to move axially and thereby compensate for the loads that may act on the hydrogen fuel line 114b.

These loads are typically greatest during flight and ground manoeuvres of the aircraft 1, and so benefits of having the hydrogen fuel line 114a, 114b substantially unconstrained along an axial direction of the hydrogen fuel line 114a, 114b between the first end 131 and the second end 132, and having at least one end 131, 132 moveable in the axial direction of the hydrogen fuel line 114a, 114b, may be experienced more prominently when the aircraft is in operation (e.g. flight and ground manoeuvres).

As a consequence, the number of pipes, couplings, bellows and other components of the hydrogen fuel line 114b may be reduced. In the example of FIGS. 6 and 7, each hydrogen fuel line 114b does not include any such components and so has a single continuous fuel pipe extending from the first end 131 to the second end 132. Such a continuous hydrogen fuel line 114a, 114b may be referred to as being uninterrupted between the first end 131 and the second end 132.

Figure 8:
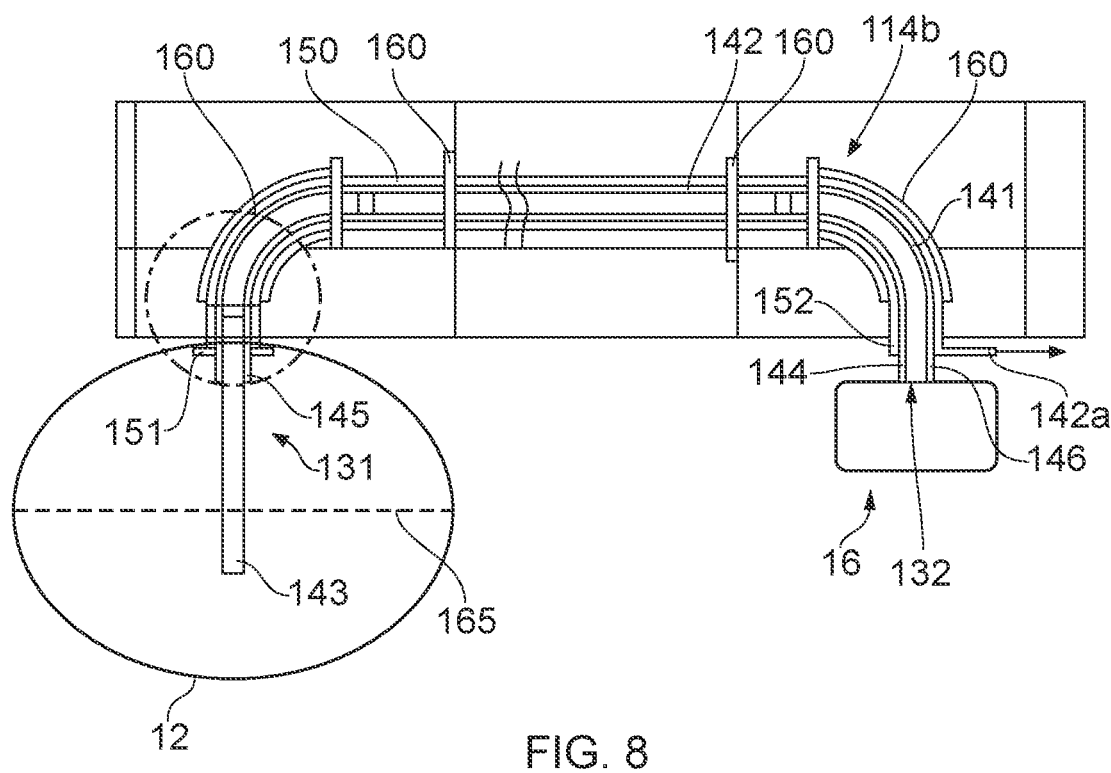
FIG. 8 shows a cross-section of a fuel line extending between a refuelling port and a fuel tank.

FIG. 8 shows an example of a hydrogen fuel line 114b extending from a first end 131 to a second end 132, with the first end 131 located at a hydrogen fuel tank 12 and the second end 132 at an aircraft refuelling port 16 of the aircraft 1.

The hydrogen fuel line 114b comprises a first fuel pipe 141 configured to convey liquid hydrogen from the aircraft refuelling port 16 to the hydrogen fuel tank 12. As the hydrogen fuel tank 12 is filled with liquid hydrogen via the first fuel pipe 141, gaseous hydrogen builds up in the hydrogen fuel tank 12. To remove this gaseous hydrogen, a second fuel pipe 142 extends from the hydrogen fuel tank 12.

Figure 9A:
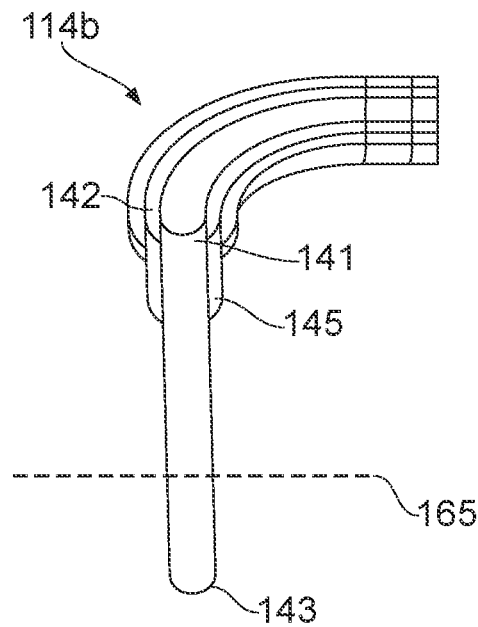
FIG. 9A shows a cross-section of the fuel line.
Figure 9B:
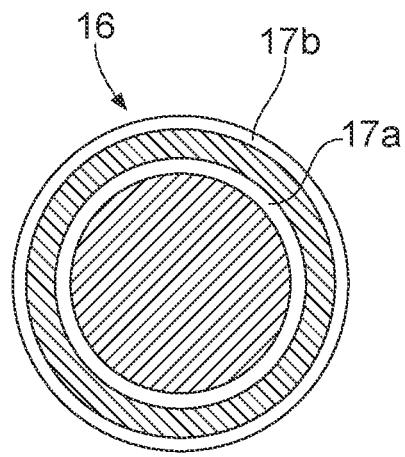
FIG. 9B shows a cross-section of a refuelling port.

The gaseous hydrogen typically may have a temperature of around −245° C. to −250° C., in comparison to the liquid hydrogen which has a temperature below −253° C. at atmospheric pressures. As shown, for example, in FIGS. 8 and 9A, the second fuel pipe 142 may surround the first fuel pipe 141, with the second fuel pipe 142 configured to convey the gaseous hydrogen from the fuel tank 12 to the aircraft refuelling port 16. Similarly, for example as shown in FIG. 9B, the refuelling port 16 may comprise a first fuel port section 17a configured to convey liquid hydrogen towards the fuel tank 12, and a second fuel port section 17b surrounding the first fuel port section 17a and configured to convey gases (such as gaseous hydrogen) away from the fuel tank 12. The first fuel port section 17a is arranged to couple to the first fuel pipe 141, and the second fuel port section 17b is configured to couple to the second fuel pipe 142.

As the second fuel pipe 142 surrounds the first fuel pipe 141, the gaseous hydrogen acts as a thermal insulator between the atmospheric temperatures around the hydrogen fuel line 114b and the liquid hydrogen in the first fuel pipe 141. This helps to maintain a low (cryogenic) temperature so as to maintain the hydrogen in a liquid state as it enters the fuel tank 12.

The first end 143 of the first fuel pipe 141 and the first end 145 of the second fuel pipe 142 may both extend into the fuel tank 12. The second end 144 of the first fuel pipe 141 and the second end 146 of the second fuel pipe 142 may both extend towards the aircraft refuelling port 16. The second end 145 of the second fuel pipe 142 may be positioned to allow the gaseous hydrogen to escape to atmosphere.

The first fuel pipe 141 may extend further into the fuel tank 12 than the second fuel pipe 142. This may assist the second fuel pipe 142 in conveying the gaseous hydrogen from the fuel tank 12, as the second fuel pipe 142 may be positioned above the liquid hydrogen in contact with any gaseous hydrogen, or other gases, in the fuel tank 12. FIGS. 8 and 9A show an example in which the first end 143 of the first fuel pipe 141 is located below a line 165 of the liquid hydrogen and the first end 145 of the second fuel pipe 142 is located above the line 165 of the liquid hydrogen.

In some examples, an outer pipe 150 may surround the hydrogen fuel line 114b. The outer pipe 150 may act as an additional insulation layer to the hydrogen fuel line 114b, as well as protect the hydrogen fuel line 114b. As the outer pipe 150 is not intended to convey the hydrogen between the first end 131 and the second end 132 of the hydrogen fuel line 114b, the outer pipe 150 may include couplings, multiple sections of pipe, bellows and other components that compensate for the loads that may act on the outer pipe 150.

The outer pipe 150 may be fixedly coupled at a first end 151 proximate the fuel tank 12 and fixedly coupled at a second end 152. The second end 152 may be proximate the aircraft power plant (e.g. engines 9 and/or fuel cells 70) or the aircraft refuelling port 16.

The hydrogen fuel line 114b may expel gases evacuated through the second fuel pipe 142 at the second end 132. The second fuel pipe 142 may include a section of pipe 142a extending away from the aircraft 1 and/or aircraft refuelling port 16 so as to redirect the gases to a location distal from the aircraft 1 and/or aircraft refuelling port 16.

In some examples, such as shown in FIG. 8, one or more guides 160 (e.g. clamps or fairleads) may be located adjacent the outer pipe 150 and/or the hydrogen fuel line 114a, 114b. The guides 160 may assist in directing the outer pipe 150 and/or the hydrogen fuel line 114a, 114b. The guides 160 may constrain the outer pipe 150 (or the hydrogen fuel line 114a, 114b) so that in-plane movements are restricted whilst axial movements are permitted.

In some examples, the first and/or second ends 131, 132 of the hydrogen fuel lines 114a, 114b may be coupled to part of the aircraft 1, such as the aircraft refuelling port 16, with the coupling being arranged to allow at least some limited movement of that end 131, 132 of the hydrogen fuel line 114a, 114b. For example, the coupling may be arranged via one or more flexible elements 170.

Figure 10:
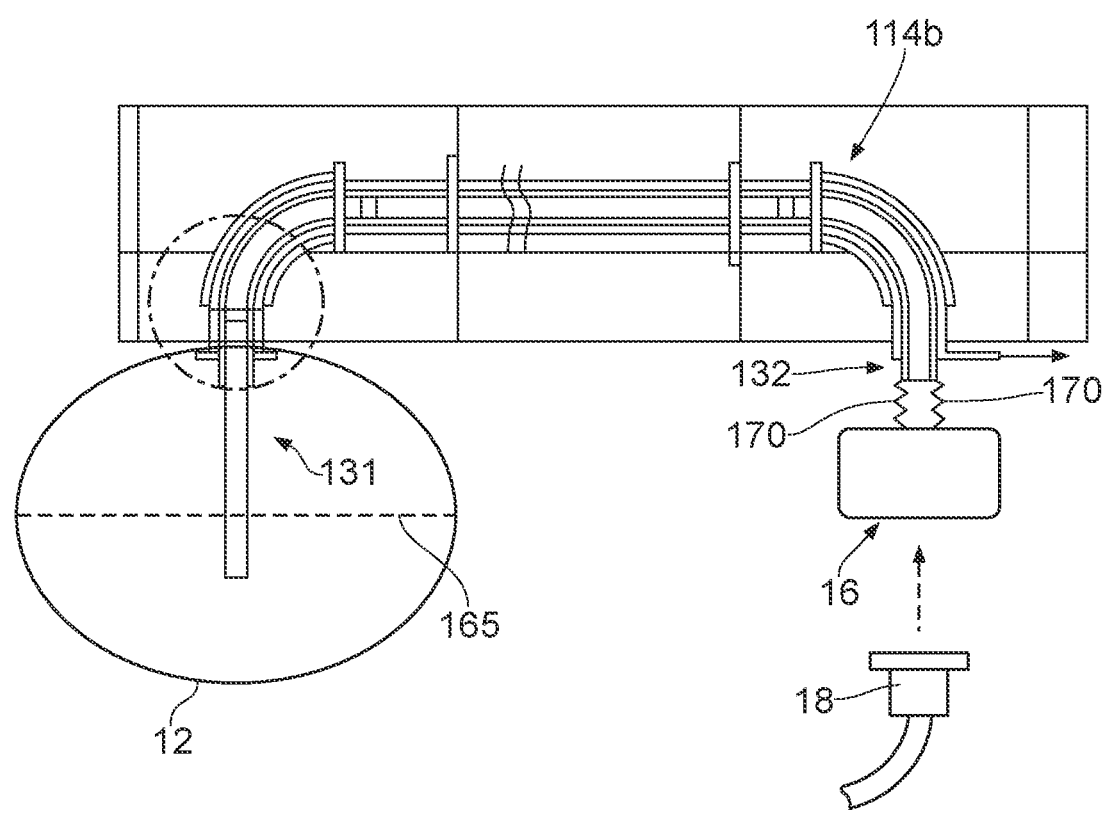
FIG. 10 shows a cross-section of an alternative fuel line extending between a refuelling port and a fuel tank.

FIG. 10 shows an example in which the hydrogen fuel line 114b extends between a hydrogen fuel tank 12 and an aircraft refuelling port 16. The second end 132 is coupled at the aircraft refuelling port 16 via a flexible element 170 that allows limited movement of the second end 132 relative to the aircraft refuelling port 16. In this way, the second end 132 is moveable along the axial direction, to mitigate the effects of loads acting on the fuel line 114b, whilst the second end 132 is maintained in the locality of the aircraft refuelling port 16 so that a refuelling coupler (not shown) can be more easily connected to the second end 132 so as to fill the hydrogen fuel tank 12.

Whilst the example in FIG. 10 shows an example of a hydrogen fuel line 114b extending between a hydrogen fuel tank 12 and an aircraft refuelling port 16, with the second end 132 coupled at the aircraft refuelling port 16 via a flexible element 170, it will be understood that the flexible element 170 may be located at either end 131, 132 of the hydrogen fuel line 114a, 114b.

In some examples, an end 131, 132 of the hydrogen fuel line 114a, 114b may be releasably coupled at said end 131, 132, such as at the aircraft refuelling port 16. In other words, the end 131, 132 is selectively releasable at said end 131, 132. For example, a second end 132 of the hydrogen fuel line 114a, 114b may configurable between a first configuration, in which the second end 132 is fixedly attached at the aircraft refuelling port 16, and a second configuration, in which the second end 132 is movable relative to the aircraft refuelling port 16.

It will be understood that the hydrogen fuel line 114a, 114b may comprise any suitable number of pipes 141, 142, for example one, two or three pipes 141, 142. The pipes 141, 142 may be arranged concentrically. The hydrogen fuel line 114a, 114b may or may not comprise an outer pipe 150 that surrounds the hydrogen fuel line 114a, 114b.

FIG. 10 shows a refuelling coupling 18 arranged to connect to the aircraft refuelling port 16, although it will be appreciated that the refuelling coupling 18 may connect to an aircraft refuelling port 16 of any example disclosed herein. With this arrangement, it is possible to recover the gases expelled from the fuel tank 12 through the second fuel port section 17b, preventing the gaseous hydrogen from releasing to atmosphere or redirecting the gases to escape to atmosphere at a different location distal from the aircraft 1 and/or aircraft refuelling port 16.

Figure 11:
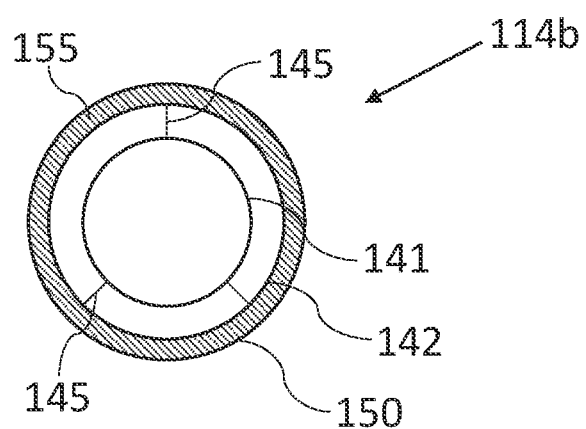
FIG. 11 shows a cross-section of a first example of a fuel line.
Figure 12:
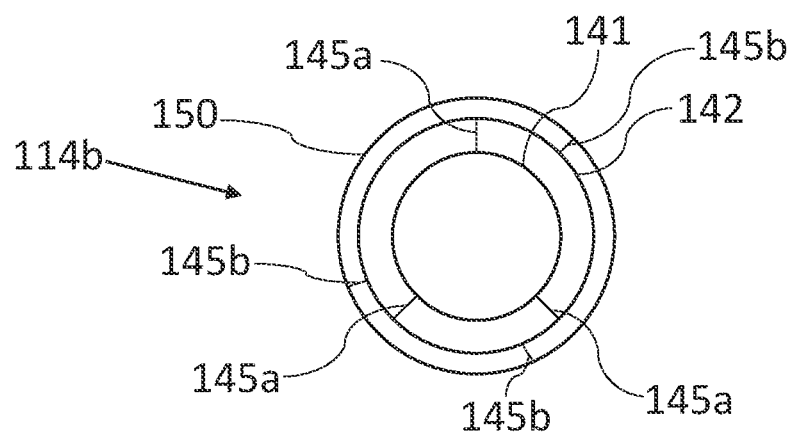
FIG. 12 shows a cross-section of a second example of a fuel line.

FIG. 11 shows an example in which the first fuel pipe 141 and second fuel pipe 142 are separated by spacers 145. An insulating material 155 is located between the second fuel pipe 142 and the outer pipe 150. The insulating material may be any suitable material known in the art. FIG. 12 shows an example in which a vacuum is provided between the outer pipe 150 and the second fuel pipe 142 of the hydrogen fuel line 114a. In this example, spacers 145a are provided between the first fuel pipe 141 and the second fuel pipe 142, and spacers 145b are provided between the second fuel pipe 142 and the outer pipe 150. In some examples, the outer pipe 150 may be further insulated by one or more layers of insulation material. In some examples, the hydrogen fuel line 114a, 114b may not comprise a second fuel pipe 142 and/or an outer pipe 150.

The hydrogen fuel line 114a, 114b may be formed so as to accommodate at least some of the various deflections and loads impacting the hydrogen fuel line 114a, 114b. For example, the hydrogen fuel line 114a, 114b (the first fuel pipe 141 and/or the second fuel pipe 142 of such) may be formed of a material and/or be designed such that the hydrogen fuel line 114a, 114b is able to accommodate deflections and other forces acting on the hydrogen fuel line 114a, 114b. The hydrogen fuel line 114a, 114b may include a corrugated metal pipe, or include a fibre reinforced composite pipe, that allows at least some flexibility with respect to an equivalent circular cross-section metal pipe without corrugations. In some cases, particularly when the hydrogen fuel line 114a, 114b includes a corrugated metal pipe, the hydrogen fuel line 114a, 114b may include a smooth inner liner (not shown) that reduces disturbances of the hydrogen fuel flowing through the fuel line 114a, 114b.

It will be appreciated that the examples described above are applicable to a hydrogen fuel line 114a, 114b extending from a first end 131 at a hydrogen fuel tank 12 to a second end 132 at an aircraft power plant or aircraft refuelling point 16, with the hydrogen fuel tank 12, aircraft power plant and aircraft refuelling point 16 locatable in any suitable location on the aircraft 1.

Figure 13:
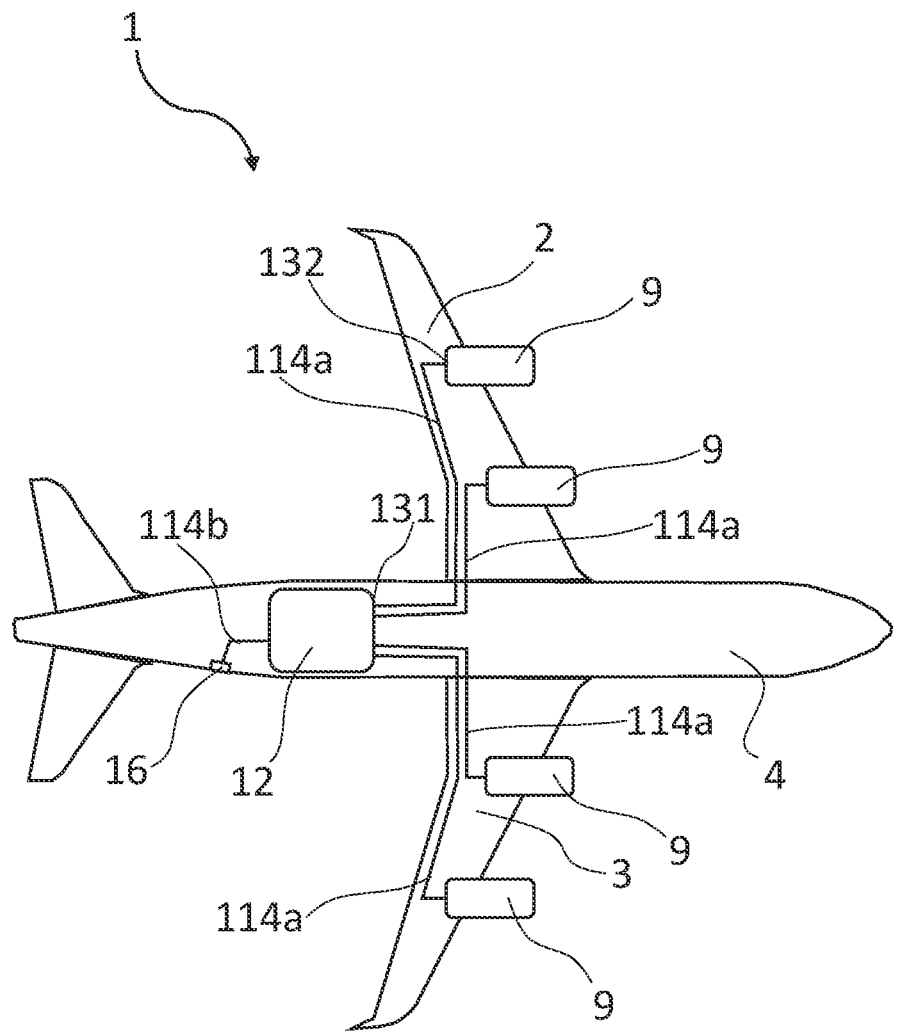
FIG. 13 shows an example of an aircraft fuel system on an aircraft.

FIG. 13 shows an example in which the hydrogen fuel tank 12 is located in the fuselage 4, with a plurality of hydrogen fuel lines 114a extending from a respective first end 131 at the hydrogen fuel tank 12 to a respective second end 132 at respective aircraft engines 9 located on the wings 2, 3 (the first and second ends 131, 132 of only one of the hydrogen fuel lines 114a is shown in FIG. 13). Preferably, the second end 132 will be fixedly coupled at the aircraft engines 9.

In addition, a hydrogen fuel line 114b extends from the hydrogen fuel tank 12 to an aircraft refuelling port 16 located on the fuselage 4, although it will be understood that the aircraft refuelling port 16 may be located elsewhere on the aircraft 1.

Figure 14:
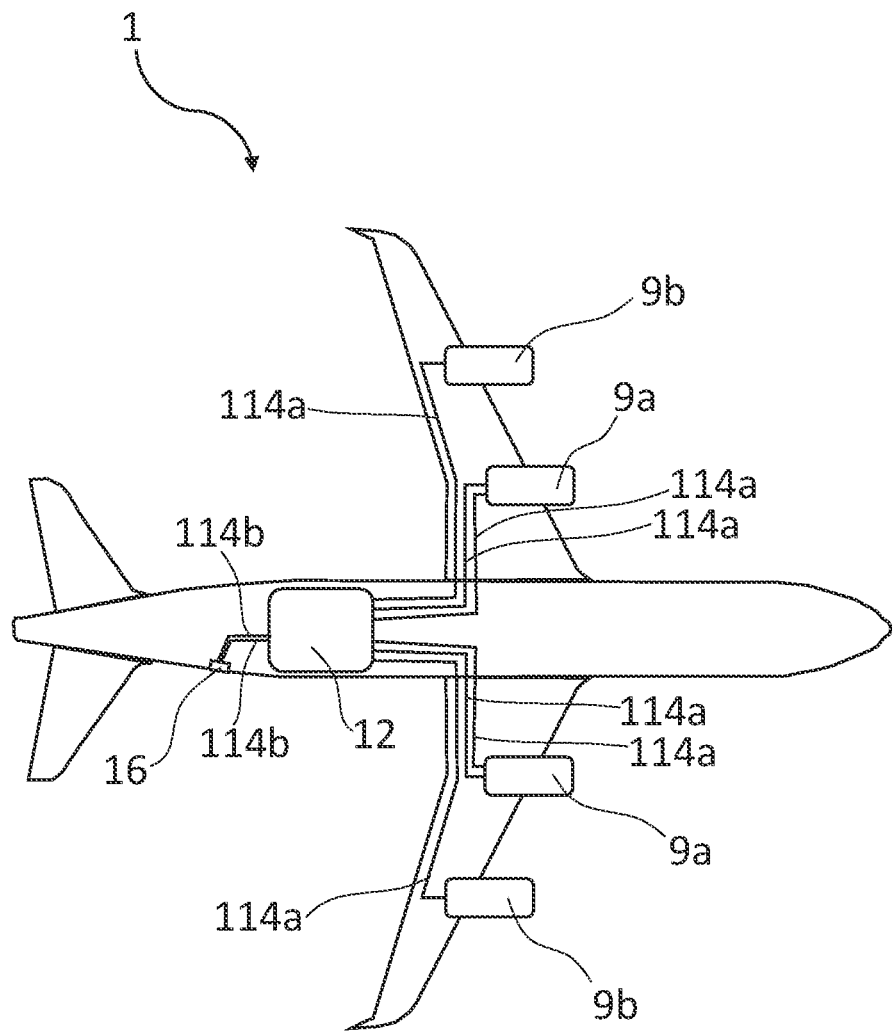
FIG. 14 shows a further example of an aircraft fuel system in which multiple fuel lines extend to the engines.

In the examples discussed above, a single hydrogen fuel line 114a, 114b extends between each power plant (e.g. engine 9) and hydrogen fuel tank 12, and between each hydrogen fuel tank 12 and aircraft refuelling port 16. However, it will be understood that two or more hydrogen fuel lines 114a, 114b may extend between a particular power plant and hydrogen fuel tank 12, or between a particular aircraft refuelling port 16 and hydrogen fuel tank 12. FIG. 14 shows an example in which two hydrogen fuel lines 114a extend between the hydrogen fuel tank 12 and inner engines 9a of the aircraft 1, and in which two hydrogen fuel lines 114b extend between the hydrogen fuel tank 12 and the aircraft refuelling port 16. Two or more hydrogen fuel lines 114a may also extend between the hydrogen fuel tank 12 and the outer engines 9b in some examples. These additional hydrogen fuel lines 114a, 114b provide additional paths for fuel to flow, for example in the event that one or more of the hydrogen fuel lines 114a, 114b is inoperable or otherwise inadequate.

Whilst the examples above show an aircraft 1 that includes hydrogen fuel lines 114a, 114b that are part of a fuel system which directly burns the liquid hydrogen, it will be understood that the fuel system is equally applicable to hydrogen fuel lines 114a, 114b forming part of any aircraft power plant system that includes fuel cells 70.

Figure 15:
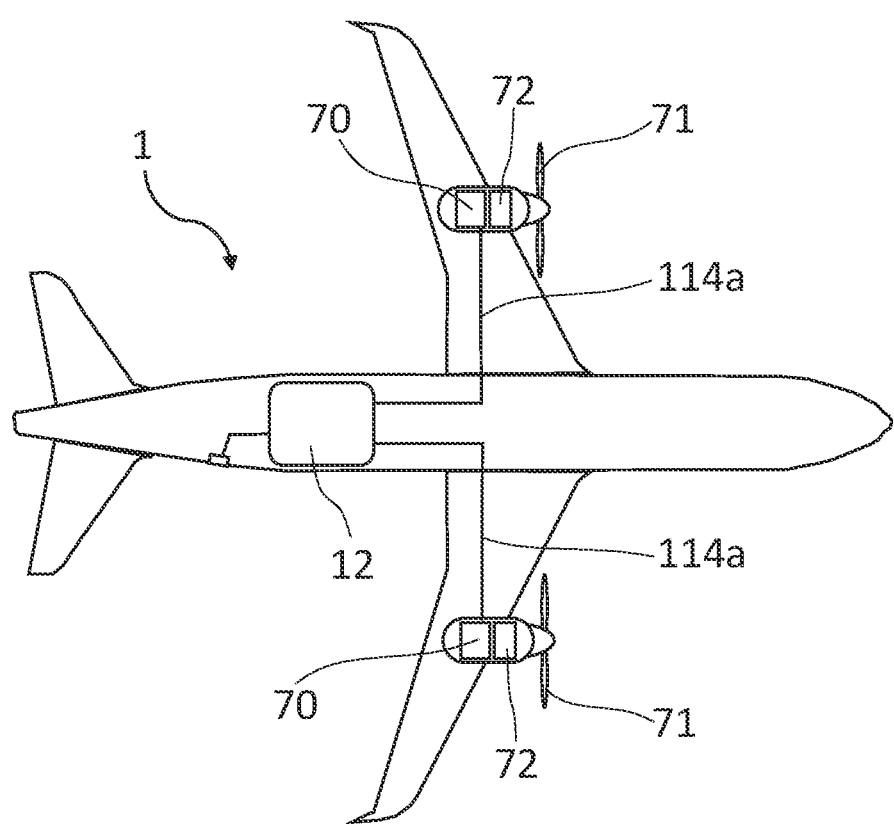
FIG. 15 shows a further example of an aircraft fuel system for a fuel cell powered aircraft.

FIG. 15 shows an example in which an aircraft 1 includes fuel cells 70 configured to power an electromotor 72, that drive one or more propellers 71. A hydrogen fuel line 114a extends from the hydrogen fuel tank 12 to the fuel cells 70, with the hydrogen converted to electricity by the fuel cells 70 to power (e.g.) an electromotor 72.

The examples described above reference an aircraft 1 including one fuel tank 12, although it will be appreciated that the aircraft 1 may include any suitable number of fuel tanks 12. One or more of the fuel tanks 12 may be co-located, so as to be located directly next to one another, and/or one or more of the fuel tanks 12 may be located in different locations on the aircraft 1. For example, one or more fuel tanks 12 may be located in the wings 2, 3, and one or more fuel tanks 12 may be located in the fuselage 4. The fuel tanks 12 may be located in separate parts of the wings 2, 3, such as towards a wing tip and towards a wing root, and may be located in separate parts of the fuselage 4, such as towards a nose end 5 and towards a tail end 6 of the fuselage 4. The one or more fuel tanks 12 may be mounted to an outer surface of the aircraft 1, such as mounted to a wing 2, 3.

The examples described above refer to the engines 9 and/or fuel cells 70 as being located on the wings 2,3, although it will be appreciated that the engines 9 and/or fuel cells 70 may be located on any suitable part of the aircraft, such as the fuselage 4.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft comprising:
   a fuel tank for storing liquid hydrogen;
   an aircraft power plant and/or an aircraft refueling port; and
   a hydrogen fuel line extending from a first end to a second end, the first end at the fuel tank and the second end at one of the aircraft power plant and the aircraft refueling port, wherein the hydrogen fuel line is coupled near the first end to the fuel tank, and wherein hydrogen fuel line is coupled near the second end to one of the aircraft power plant and the aircraft refueling port;
   wherein the hydrogen fuel line is rigidly continuous and substantially unconstrained along an axial direction of the hydrogen fuel line along a full length of the hydrogen fuel line between the first end and the second end; and
   wherein the first and/or second end of the hydrogen fuel line is configured to move in the axial direction of the hydrogen fuel line.

2. The aircraft of claim 1, wherein the hydrogen fuel line is uninterrupted between the first end and the second end.

3. The aircraft of claim 1, further comprising a fuselage and a wing, and wherein the hydrogen fuel line extends between the fuselage and the wing.

4. The aircraft of claim 1, wherein the hydrogen fuel line extends along at least 30% of a total length of the fuselage and/or at least 30% of a span of a wing.

5. The aircraft of claim 1, wherein the aircraft power plant is an aircraft engine or an electromotor.

6. The aircraft of claim 1, wherein the first end extends into the fuel tank and is moveable along the axial direction of the hydrogen fuel line and/or wherein the second end is moveable along the axial direction of the hydrogen fuel line.

7. The aircraft of claim 6, wherein the second end is at the aircraft refueling port.

8. The aircraft of claim 1, further comprising an outer pipe surrounding the hydrogen fuel line, wherein the outer pipe is fixedly coupled at a first end at the fuel tank and fixedly coupled at a second end at the aircraft power plant or the aircraft refueling port.

9. The aircraft of claim 8, further comprising a vacuum between the outer pipe and the hydrogen fuel line.

10. The aircraft of claim 1, wherein
    the second end of the hydrogen fuel line is at the aircraft refueling port;
    wherein the hydrogen fuel line comprises a first fuel pipe configured to convey liquid hydrogen from the aircraft refueling port to the fuel tank, and a second fuel pipe surrounding the first fuel pipe and configured to convey gases from the fuel tank to the aircraft refueling port.

11. The aircraft of claim 10, wherein the first end extends into the fuel tank and is moveable along the axial direction of the hydrogen fuel line and/or wherein the second end is moveable along the axial direction of the hydrogen fuel line.

12. The aircraft of claim 11, wherein the second end is at the aircraft refueling port.

13. The aircraft of claim 10, comprising an outer pipe surrounding the hydrogen fuel line, wherein the outer pipe is fixedly coupled at a first end at the fuel tank and fixedly coupled at a second end at an aircraft power plant or the aircraft refueling port.

14. The aircraft of claim 13, further comprising a vacuum between the outer pipe and the hydrogen fuel line.

15. The aircraft of claim 10, wherein the second fuel pipe is configured to convey gaseous hydrogen from the fuel tank to the aircraft refueling port.

16. The aircraft of claim 10, comprising a fuselage and a wing, and wherein the hydrogen fuel line extends between the fuselage and the wing.

17. The aircraft of claim 10, wherein the hydrogen fuel line extends along at least 30% of a total length of the fuselage and/or at least 30% of a span of a wing.

18. The aircraft of claim 10, wherein the aircraft comprises an aircraft power plant, and the aircraft power plant is an aircraft engine or an electromotor.

19. The aircraft of claim 10, wherein the hydrogen fuel line is uninterrupted between the first end and the second end.

20. A method of refueling an aircraft, comprising:
- coupling a hydrogen refueling hose to an aircraft refueling port, the refueling port comprising a first fuel port section configured to convey liquid hydrogen towards a hydrogen fuel tank, and a second fuel port section surrounding the first fuel port section and configured to convey gases away from the hydrogen fuel tank, wherein a first and/or second end of the hydrogen fuel line is configured to move in the axial direction of the hydrogen fuel line;
- delivering liquid hydrogen fuel through the first fuel port section to a hydrogen fuel tank of the aircraft; and
- recovering gases expelled from the hydrogen fuel tank through the second fuel port section.

* * * * *